(12) United States Patent
Zarri et al.

(10) Patent No.: US 8,423,022 B2
(45) Date of Patent: Apr. 16, 2013

(54) METHOD FOR OPERATING A CLOSED SUBSCRIBER GROUP (CSG) CELL FOR OPEN NETWORK ACCESS

(75) Inventors: Michele Zarri, London (GB); Michael Kurz, Vienna (AT)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 13/063,769

(22) PCT Filed: Aug. 10, 2009

(86) PCT No.: PCT/EP2009/005785
§ 371 (c)(1),
(2), (4) Date: Jun. 14, 2011

(87) PCT Pub. No.: WO2010/040426
PCT Pub. Date: Apr. 15, 2010

(65) Prior Publication Data
US 2011/0250885 A1    Oct. 13, 2011

(30) Foreign Application Priority Data
Oct. 10, 2008  (DE) .......................... 10 2008 050 919

(51) Int. Cl.
*H04W 4/00* (2009.01)
(52) U.S. Cl.
USPC ....................................................... 455/435.1
(58) Field of Classification Search ................ 455/435.2
See application file for complete search history.

(56) References Cited

U.S. PATENT DOCUMENTS

| | | | |
|---|---|---|---|
| 2008/0227447 A1 * | 9/2008 | Jeong et al. | 455/434 |
| 2008/0267153 A1 | 10/2008 | Mukherjee | |

FOREIGN PATENT DOCUMENTS

| | | |
|---|---|---|
| EP | 0005785 A1 | 12/1979 |
| EP | 1032236 A | 6/2000 |

OTHER PUBLICATIONS

Tmobile "3GPP Draft; CSG ID definition and selective paging," Aug. 22, 2008 p. 103, XP050319061.
Nokia Siemenss networks "RS-073634; LS on SSG Cells Handling," Aug. 24, 2007, XP050135316.
Nokia Siemens Networks, LS on CSB Cells Handling, Release 8 LTE-L23, Benoist Sebire, Benoist.sebire@nsn.com, 3GPP TSG-RAN WG2 Meeting #59, Athens, Greece, Aug. 20-24, 2007.
T-Mobile,CSG ID definition and selective paging, Inormation document, 3GPP TSG-RAN2 Meeting #63, Jeju-do, South Korea, Aug. 18-22, 2008, R2-083868.
GSM, UMTS, services, 3GPP TS 22.011 V8.5.0(Sep. 2008), Valbonne, France, http://www/3gpp.org.

* cited by examiner

*Primary Examiner* — Temica M Beamer
*Assistant Examiner* — Joel Ajayi
(74) *Attorney, Agent, or Firm* — Andrew Wilford

(57) ABSTRACT

Method for operating one or more cells (10) of a cellular mobile network, each cell (10) being identifiable by an emitted cell identifier (CSG_ID) use being limited/limitable to closed subscriber groups by the cell (10) having a corresponding identifier (CSG_ID) and the cell terminals (UE1, UE2, UE3) being registered in the respective cell (10) for use of the cellular mobile network services only after a positive matching with a positive list of authorized cell identifiers (CSG_ID1, CSG_ID2, CSG_ID3) which are stored in the cell terminal (UE1, UE2, UE3), the cell (10) emitting one or more further cell identifiers (CSG_ID2, CSG ID3) in parallel in addition to a first cell identifier (CSG_ID1), and that registration in the cell (10) and use of network services can take place by a first closed subscriber group to which a first group of cell terminals (UE1) belongs, whose respective positive lists contain the first cell identifier (CSG_ID1), and that registration in the cell (10) and use of network services can take place by one or more further open or closed subscriber groups to which one or more other groups of cell terminals (UE2, UE3) belong whose positive lists contain one or more of said one or more further cell identifiers (CSG ID2, CSG ID3).

12 Claims, 1 Drawing Sheet

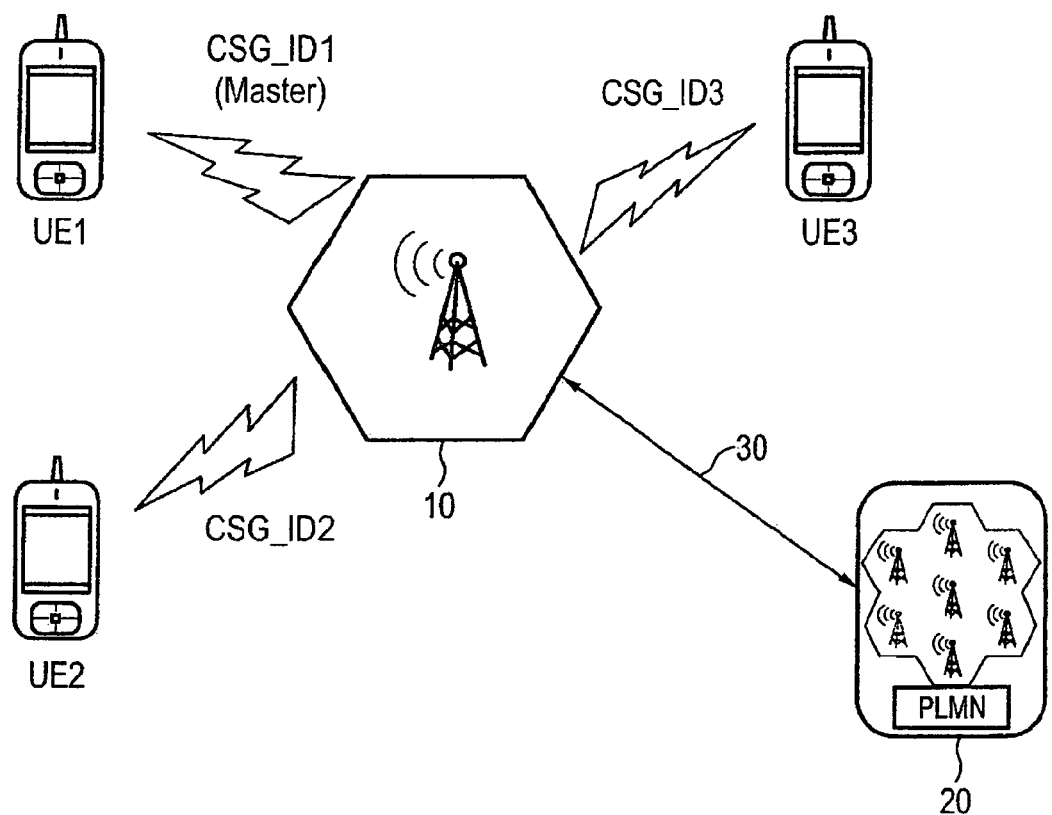

METHOD FOR OPERATING A CLOSED SUBSCRIBER GROUP (CSG) CELL FOR OPEN NETWORK ACCESS

CROSS REFERENCE TO RELATED APPLICATIONS

This application is the US national stage of PCT application PCT/EP2009/005785, filed 10 Aug. 2009, published 15 Apr. 2010 as WO2010/040426, and claiming the priority of German patent application 102008050919.1 itself filed 10 Oct. 2008.

FIELD OF THE INVENTION

The invention relates to a process for operating one or more cells of a cellular land mobile network, each cell being identifiable by an emitted cell identifier, use being limited/limitable to closed subscriber groups by the cell having a corresponding identifier and the cell terminals being checked into the respective cell for use of the land mobile network services only after a positive matching with a positive list of authorized cell identifiers which is stored in the cell terminal.

BACKGROUND OF THE INVENTION

The invention furthermore relates to a cellular system which has a land mobile network with a plurality of cells in which cell terminals can check-in for use of the services of the cellular system, each cell being identifiable by an emitted cell identifier, use being limited/limitable to closed subscriber groups by the cell having a corresponding identifier and the cell terminals being checked into the respective cell for use of the land mobile network services only after a positive matching with a positive list of authorized cell identifiers stored in the cell terminal.

These cells for so-called closed subscriber groups (CSG) are consequently known. These CSG cells are identified by a cell identifier emitted from the CSG cell or cell identity (CSG-ID) which is emitted by the CSG cell. A cell terminal, also called user equipment (UE), then tries to check into such a CSG cell only when the cell identity CSG-ID received by the cell terminal (UE) and emitted by the cell is contained on the positive list (white list) which supports the cell terminal UE and the cell terminal is thus identified as belonging to the closed subscriber group (CSG).

Cell terminals which do not belong to the closed subscriber group (CSG) cannot check into this cell so that in this way use of the services of the land mobile network is not possible for these cell terminals. Only an emergency call can be transmitted. General use of the network services is however not possible.

The disadvantage is that it is not possible for the operator of such a cell for closed subscriber groups to enable the cell for checking-in and using the land mobile network services for other cell terminals, even if this is desirable since the operator of such a cell does not have access to the positive lists (white list) of authorized cell identifiers stored in the different cell terminals.

OBJECT OF THE INVENTION

The object of the invention is to develop a process for operating one or more cells of a cellular land mobile network, and a corresponding cellular system such that network access for members of other closed subscriber groups and/or open network access is possible.

SUMMARY OF THE INVENTION

In the process for operating one or more cells of a cellular land mobile network, each cell being identifiable by an emitted cell identifier, use being limited/limitable to closed subscriber groups by the cell having a corresponding identifier and the cell terminals being checked into the respective cell for use of the land mobile network services only after positive matching with a positive list of authorized cell identifiers stored in the cell terminal, it is especially advantageous that the cell in addition to the first cell identifier emits one or more further cell identifiers in parallel and that checking-in in the cell and use of network services can take place by a first closed subscriber group to which a first group of cell terminals belongs, whose respective positive lists contain the first cell identifier, and that checking-in in the cell and use of network services can take place by one or more other open or closed subscriber groups to which one or more further groups of cell terminals belong whose positive lists contain one or more further cell identifiers.

In the cellular system, especially for execution and application of the process as described below, having a land mobile network with a plurality of cells into which cell terminals for use of services of the cellular system can check, each cell being identifiable by an emitted cell identifier, use being limited/limitable to a closed subscriber group by the cell having a corresponding identifier and the cell terminals only after a positive matching with a positive list of authorized cell identifiers stored in the cell terminal checking into the respective cell for use of services of the land mobile network, it is especially advantageous that the cell is set up to emit one or more cell further identifiers in parallel in addition to a first cell identifier, and that checking-in in the cell and use of network services can take place by a first closed subscriber group to which a first group of cell terminals belongs whose respective positive lists contain the first cell identifier, and that checking-in in the cell and use of network services take place/can take place by one or more further open or closed subscriber groups to which one or more other groups of cell terminals belong whose positive lists contain one or more further cell identifiers.

The process of the invention and the cellular system of the invention thus make it possible for a cell for a closed subscriber group (CSG), a so-called CSG cell, to emit a plurality of cell identities so that a plurality of closed subscriber groups, i.e. members of these different closed subscriber groups, are enabled to check-in in the cell and to use the services of the land mobile network.

Preferably the first cell identifier is the basic identifier of the cell. This basic identifier or main identifier or actual identifier of the cell is used to produce compatibility with those cell terminals which could detect and process only a single cell identity. Because the first emitted cell identity is the basic or main identity of the cell, it is also possible for these cell terminals which can acquire and process only a single cell identity to check-in in this cell and to use the services of the land mobile network within this cell.

Preferably the cell in addition to the first cell identifier emits at least one further special cell identifier in parallel so that checking-in in the cell and use of network services can take place by a cell terminal which is assigned to a certain or any public land mobile network (PLMN). In the system of the invention the cell is preferably set up accordingly to emit this further special cell identifier in parallel in addition to this first cell identifier.

In this way it is possible to open this cell which is assigned to a closed subscriber group for open network access, i.e. that the registered users of a certain or any public land mobile network can check into this cell with their cell terminal and use the services of the land mobile network since the special cell identifier or cell identity emitted parallel to the first cell identifier corresponds to the cell identifier of the public land mobile network which is recognized accordingly by a cell terminal registered in this public land mobile network.

Preferably preparation and/or availability of different or certain network services for use by means of a cell terminal takes place depending on that cell identifier which is contained on the positive list of the cell terminal. Preparation and/or availability of certain or selected network services can thus be dictated by onto which of the different emitted cell identifiers checking-in in the cell by the cell terminal takes place.

In this way it is possible to distinguish between different subscriber groups, especially between different closed subscriber groups, and different services can be made available, depending on membership in different subscriber groups. Differentiations can be made for example with respect to the quality of a service and/or with respect to the availability of special services depending on the membership of a certain cell terminal in a certain subscriber group, or in a certain closed subscriber group.

If a cell terminal is assigned to several closed subscriber groups, the CSG cell, i.e. the cell for the closed subscriber group, makes available all those services for use by means of this cell terminal to whose use the different closed subscriber groups within the cell are entitled, hi this way the most varied staggered authorizations for use for different closed subscriber groups can be formed.

Preferably the cells operated in this way are connected to a public land mobile network, especially via a broadband connection to a public land mobile network. In particular the cells operated in this way can supplement the public land mobile network PLMN in an area in which there is no network coverage by the public land mobile network.

By connection to a public land mobile network, especially by the presence of a broadband connection to a public land mobile network, network availability can also be advantageously supplemented and expanded by the cells operated according to the invention and the system as claimed in the invention.

BRIEF DESCRIPTION OF THE DRAWING

One embodiment of the invention is shown in the attached drawing.

DETAILED DESCRIPTION

The drawing shows a cell 10 which is available solely for a closed subscriber group. Accordingly cell 10 is a so-called CSG cell. CSG stands for closed subscriber group.

In the example shown schematically the CSG cell 10 is operated by a hotel chain on the grounds of the hotel and allows access to network services via the cell 10 for the following three subscriber groups (the respective registered subscribers and the respectively assigned cell terminals are not distinguished in the groups):

1. Any registered subscribers UE1 of a public land mobile network PLMN 20
2. Hotel guests UE2
3. Hotel employees UE3

In this case the CSG cell 10 will emit three different cell identities CSGJDD1, CSG_ID2, CSG_ED3 in parallel and all three indicated groups of subscribers UE1, UE2, UE3 will receive the three cell identities CSGJD1, CSG_ID2, CSGJD3 emitted in parallel and will compare them to a positive list (white list) of authorized cell identities stored in the respective cell terminal UE1, UE2, UE3 and with agreement of one of the three received cell identifiers CSG_ID1, CSG JD2, CSG_ID3 with one or more entries of the positive list in the respective cell terminal UE1, UE2, UE3 will check-in in the cell 10 for use of network services.

To link to a public land mobile network 20 the cell 10 is connected over a broadband connection 30 to a public land mobile network 20 (PLMN) and supplements this public land mobile network 20 on the grounds of the hotel of the hotel chain.

The availability of certain network services within the cell 10 can be made dependent on which of the three cell identities emitted in parallel CSGJD1, CSGJDD2, CSG_ED3 is being used and processed by the respective cell terminal UE1, UE2, UE3 for checking into the land mobile network.

The first cell identity CSG_ED1 of the cell 10 corresponds to the basic or main identifier (master) which is emitted to ensure processing of the different cell identifiers also by those cell terminals which due to hardware can store only a single cell identifier and thus process only a single cell identity.

Use of the network services is made available by the cell 10 on a priority basis to hotel guests UE2 and hotel employees UE3 and only on a lower priority basis to any subscribers UE1 of a public land mobile network PLMN 20. In this way the availability and quality of the services made available primarily for guests UE2 and employees UE3 are ensured. The scope and type of services can also be limited depending on the membership in a certain group by all network services being available without limitation to the guests UE2, conversely employees UE3 being able for example only to set up cell connections within their closed group UE3, in order to stop private calls to and from the outside. For the group UE1 of subscribers registered in the public land mobile network PLMN 20 use can be limited to basic services which is only available when there is enough network capacity and the services are temporarily not being used by hotel guests UE2.

The availability of certain network services can thus be dependent on the respective cell identity CSGJD1, CSGJD2, CSG ED3 to which a cell terminal UE1, UE2, UE3 reacts, i.e. depending on the membership in a certain subscriber group and/or can depend on parameters such as network load, number of subscribers checked in, date, time, selected service, dialed number, especially emergency number, or the like.

The invention claimed is:

1. A process for operating one or more cells of a land mobile network, each cell being identifiable by an emitted cell identifier, use of the cells being limited or limitable to closed subscriber groups such that, when one of the cells is limited to a closed subscriber group, this one cell has a first corresponding identifier that indicates the limited use and a cell terminal can only check into the one limited cell for use of the land mobile network services when the first identifier of the one limited cell matches an identifier in a positive list of authorized cell identifiers stored in the cell terminal, wherein the cell parallel emits one or more further cell identifiers in addition to the first cell identifier, and checking-in in the cell and use of network services takes place by a first cell terminal of a first group of cell terminals that belong to a first closed subscriber group when the respective positive list in the first cell terminal contains the first cell identifier, and checking-in in the cell and use of network services can take place by another cell terminal of another group of cell terminals that belong to a further open or closed subscriber group when the positive lists of the other cell terminal contains the further cell identifiers.

2. The process as claimed in claim 1, wherein the first cell identifier is the basic identifier of the cell.

3. The process as claimed in claim 1, wherein the cell in addition to the first cell identifier emits at least one further special cell identifier in parallel so that checking-in in the cell and use of network services by a cell terminal which is assigned to a certain or any public land mobile network can take place.

4. The process as claimed in claim 1, wherein preparation or availability of different network services for use by means of a cell terminal takes place depending on that cell identifier which is contained on the positive list of the cell terminal.

5. The process as claimed in claim 1, wherein the cell(s) is/are connected to a public land mobile network via a broadband connection to a public land mobile network.

6. A cellular system for execution and application of the process as claimed in claim 1, the system having a land mobile network with a plurality of cells in which cell terminals can check in for use of services of the cellular system, each cell being identifiable by an emitted cell identifier and use of the cells being limited or limitable to closed subscriber groups such that, if the use of one of the cells is limited to such a closed subscriber group, the one limited cell has a first identifier that indicates the limited use and a cell terminal can only check into the one limited cell for use of the land mobile network services when the first identifier matches an identifier in a positive list of authorized cell identifiers stored in the cell terminal, wherein the cell is set up to parallel emit one or more further cell identifiers in addition to the first cell identifier, and checking-in in the cell and use of network services can take place by a first cell terminal of a first group of cell terminals that belong to a first closed subscriber group when the respective positive list in the first cell terminal contains the first cell identifier, and checking-in in the cell and use of network services can take place by another cell terminal of another group of cell terminals that belong to a one or more further open or closed subscriber groups when the positive lists in the other first cell terminal contains the further cell identifier.

7. The system as claimed in claim 6, wherein the first cell identifier is the basic identifier of the cell.

8. The system as claimed in claim 6 wherein the cell is set up to emit in addition to the first cell identifier at least one further special cell identifier in parallel so that checking-in in the cell and use of network services can take place by a cell terminal which is assigned to a certain or any public land mobile network.

9. The system as claimed in claim 6, wherein it is set up such that different network services are made ready or available for use by means of a cell terminal depending on that cell identifier which is contained on the positive list of the cell terminal.

10. The system as claimed in claim 6, wherein the cell(s) is/are connected to a public land mobile network via a broadband connection to a public land mobile network.

11. The system as claimed in claim 10 wherein the cell(s) supplement(s) the public land mobile network in an area in which there is no network coverage by the public land mobile network.

12. The method as claimed in claim 5, wherein the cell(s) supplements(s) the public land mobile network in an area in which there is no network coverage by the public land mobile network.

* * * * *